United States Patent
Qian et al.

(10) Patent No.: US 12,261,427 B2
(45) Date of Patent: Mar. 25, 2025

(54) MANUAL TYPE C-SHAPED WIRE CLAMP OPERATING DEVICE

(71) Applicant: STATE GRID ZHEJIANG TONGXIANG ELECTRIC POWER SUPPLY COMPANY, Zhejiang (CN)

(72) Inventors: Dong Qian, Zhejing (CN); Guoliang Liu, Zhejing (CN); Hong Xu, Zhejing (CN); Chongxi Zhu, Zhejing (CN); Shengwei Shen, Zhejing (CN); Jinfan Sun, Zhejing (CN); Aoyang Hu, Zhejing (CN); Wei Zeng, Zhejing (CN)

(73) Assignee: STATE GRID ZHEJIANG TONGXIANG ELECTRIC POWER SUPPLY COMPANY, Zhejiang (CN)

( * ) Notice: Subject to any disclaimer, the term of this patent is extended or adjusted under 35 U.S.C. 154(b) by 0 days.

(21) Appl. No.: 18/024,980

(22) PCT Filed: Dec. 9, 2022

(86) PCT No.: PCT/CN2022/137852
§ 371 (c)(1),
(2) Date: Mar. 7, 2023

(87) PCT Pub. No.: WO2024/060419
PCT Pub. Date: Mar. 28, 2024

(65) Prior Publication Data
US 2024/0106217 A1    Mar. 28, 2024

(30) Foreign Application Priority Data
Sep. 22, 2022 (CN) .......................... 202211159930.2

(51) Int. Cl.
H02G 7/08 (2006.01)
H01R 4/30 (2006.01)
H01R 4/52 (2006.01)

(52) U.S. Cl.
CPC ............... *H02G 7/08* (2013.01); *H01R 4/302* (2013.01); *H01R 4/52* (2013.01)

(58) Field of Classification Search
CPC . H02G 7/08; H01R 4/302; H01R 4/52; H01R 4/489; H01R 4/42; H01R 11/15
See application file for complete search history.

(56) References Cited

U.S. PATENT DOCUMENTS

| | | | |
|---|---|---|---|
| 3,544,956 A * | 12/1970 | Chinn, Jr. ............... | H01R 11/15 174/71 R |
| 11,990,723 B2 * | 5/2024 | Jushchyshyn .......... | H01R 11/15 |
| 2018/0031794 A1 * | 2/2018 | Sakmar ................... | H02G 7/08 |

FOREIGN PATENT DOCUMENTS

CN         112821295 A   *  5/2021

* cited by examiner

*Primary Examiner* — Kimberly T Wood
(74) *Attorney, Agent, or Firm* — JCIPRNET

(57) ABSTRACT

The present invention discloses a manual type C-shaped wire clamp operating device, includes an insulating operating rod, wherein an upper end of the insulating operating rod is provided with a threaded rod, and the threaded rod includes an upper thread and a lower thread; a wire clamp clamping device, wherein the wire clamp clamping device includes a first spring, a wire clamp seat and a floating clamping block located above the wire clamp seat, a wire clamp seat threaded hole is formed in the wire clamp seat, the wire clamp seat threaded hole is in fit connection with the lower thread of the threaded rod; a drainage wire pressing device, wherein the drainage wire pressing device includes a guide rod arranged on the wire clamp seat and a drainage wire pressing block sliding along the guide rod, and a pressing block threaded hole is formed in the drainage wire pressing block.

10 Claims, 5 Drawing Sheets

MANUAL TYPE C-SHAPED WIRE CLAMP OPERATING DEVICE

CROSS-REFERENCE TO RELATED APPLICATION

This application is a 371 of international application of PCT application Ser. No. PCT/CN2022/137852, filed on Dec. 9, 2022, which claims the priority benefit of China application no. 202211159930.2, filed on Sep. 22, 2022. The entirety of each of the above-mentioned patent applications is hereby incorporated by reference herein and made a part of this specification

BACKGROUND

Technical Field

The present invention relates to the field of power connectors of power transmission lines, specifically to a manual type C-shaped wire clamp operating device.

Description of Related Art

A C-shaped wire clamp is a type of power connection hardware, which is used as a conductor connection terminal (line connector) for connecting current. The C-shaped wire clamp is made of high-strength alloy with good electrical conductivity. It has high current carrying (connection) capability and reasonable structure. The C-shaped wire clamp can always maintain a permanent and constant contact pressure between a wire and the wire clamp even when the wire undergoes thermal expansion. The contact pressure changes little as an external environment and loading conditions change, so that the C-shaped wire clamp is widely used in overhead lines. At present, the C-shaped wire clamp needs to be mounted by a wire clamp mounting device. However, current wire clamp mounting devices have a complex structure and poor working stability. In particular, in a working process, a drainage wire pre-assembled on the C-shaped wire clamp is unstable, and even falls off.

SUMMARY

The present invention aims to provide a manual type C-shaped wire clamp operating device which has a simple structure, convenient operation and good working stability, and can effectively solve the problem in the prior art where a drainage wire pre-assembled on the C-shaped wire clamp is unstable.

The technical solution of the present invention is as follows. A manual type C-shaped wire clamp operating device is provided, including: an insulating operating rod, where an upper end of the insulating operating rod is provided with a threaded rod, the threaded rod includes an upper thread and a lower thread, and the upper thread and the lower thread have opposite helical directions; a wire clamp clamping device, where the wire clamp clamping device includes a first spring, a wire clamp seat and a floating clamping block located above the wire clamp seat, a wire clamp placement port for placing a C-shaped wire clamp is formed between the wire clamp seat and the floating clamping block; the first spring is used for driving the floating clamping block to move down, so as to clamp the C-shaped wire clamp in the wire clamp placement port, a wire clamp seat threaded hole is formed in the wire clamp seat; and the wire clamp seat threaded hole is in fit connection with the lower thread of the threaded rod; and a drainage wire pressing device, used for pressing a drainage wire, where the drainage wire pressing device includes a guide rod arranged on the wire clamp seat and a drainage wire pressing block sliding along the guide rod, the guide rod is parallel to the threaded rod, a pressing block threaded hole is formed in the drainage wire pressing block, the drainage wire pressing block is located above the wire clamp seat, and the pressing block threaded hole is in fit connection with the upper thread of the threaded rod.

Specific use of the manual type C-shaped wire clamp operating device of this solution is as follows. First, the C-shaped wire clamp is placed in the wire clamp placement port; the first spring drives the floating clamping block to move down, so as to clamp the C-shaped wire clamp in the wire clamp placement port; and the drainage wire is pre-assembled on the C-shaped wire clamp.

Second, the insulating operating rod drives the threaded rod to rotate (the wire clamp seat is kept not rotating in the process); by rotating the threaded rod, the wire clamp seat and the drainage wire pressing block get close to each other (the wire clamp seat moves up, and the drainage wire pressing block moves down); and the drainage wire pressing block presses the drainage wire pre-assembled on the C-shaped wire clamp, so that the drainage wire is reliably fixed on the C-shaped wire clamp to avoid a problem where the drainage wire pre-assembled on the C-shaped wire clamp is unstable in a subsequent working process, and even falls off.

Third, the insulating operating rod delivers the C-shaped wire clamp and the drainage wire to a position near a main overhead line, and the main overhead line is hung into the C-shaped wire clamp; and then, an operator screws up a nut of the C-shaped wire clamp through a nut screw-up tool, thus fixing the C-shaped wire clamp on the main overhead line. Fourth, the insulating operating rod drives the threaded rod to rotate, so that the wire clamp seat and the drainage wire pressing block get away from each other (the wire clamp seat moves down, and the drainage wire pressing block moves up), and the drainage wire pressing block releases the drainage wire; afterwards, the wire clamp clamping device can be separated from the C-shaped wire clamp.

The manual type C-shaped wire clamp operating device of this solution has a simple structure, convenient operation and good working stability, and can effectively solve the problem in the prior art where a drainage wire pre-assembled on the C-shaped wire clamp is unstable.

As a preference, the manual type C-shaped wire clamp operating device further includes a release structure; and the release structure includes a release stop rod arranged on the floating clamping block; and the release stop rod is located above the drainage wire pressing block. In a process where the drainage wire pressing block slides up along the guide rod, after the drainage wire pressing block resists against the release stop rod, the drainage wire pressing block drives the floating clamping block to move up through the release stop rod. In this way, after the C-shaped wire clamp is fixed on the main overhead line, the operator drives the threaded rod to rotate through the insulating operating rod, so that in the process where the wire clamp seat and the drainage wire pressing block get far away from each other (the wire clamp seat moves down, and the drainage wire pressing block moves up), the drainage wire pressing block first releases the drainage wire. Then, the drainage wire pressing block resists against the release stop rod, and the release stop rod drives the floating clamping block to move up (to overcome an acting force of the first spring), thus enabling the floating clamping block to release the C-shaped wire clamp. Hereafter, the wire clamp clamping device can be conveniently separated from the C-shaped wire clamp to complete the mounting of the C-shaped wire clamp.

As a preference, the manual type C-shaped wire clamp operating device further includes an anti-rotating locking structure. The anti-rotating locking structure includes: a supporting disk, where the supporting disk is provided with a guide sleeve, the guide sleeve slidably sleeves the insulating operating rod; an upper portion of the insulating operating rod is provided with an operating rod limiting block, the guide sleeve is located above the operating rod limiting block, and the supporting disk is provided with a supporting disk guide hole and a supporting disk screw hole; a floating limiting disk, where a limiting disk passing port is arranged in the middle of the floating limiting disk, the threaded rod passes through the limiting disk passing port, the floating limiting disk is located between the supporting disk and the wire clamp seat, the floating limiting disk is provided with a limiting disk guide rod, and the limiting disk guide rod is slidably inserted in the supporting disk guide hole; a supporting screw rod, where the supporting screw rod is parallel to the insulating operating rod, the supporting screw rod is matched with the supporting disk screw hole, and the supporting screw rod is located below the floating limiting disk to support the floating limiting disk; and an insulating drive rod, where an upper end of the insulating drive rod is connected with a lower end of the supporting screw rod.

In a working process, although the drainage wire pressing device reliably fixes the drainage wire on the C-shaped wire clamp, in the process where the insulating operating rod delivers the C-shaped wire clamp and the drainage wire to the position near the main overhead line, the longer drainage wire may possibly drive the C-shaped wire clamp, the wire clamp clamping device and the drainage wire pressing device to rotate around the threaded rod as a whole, so that the wire clamp seat and the drainage wire pressing block get far away from each other (the wire clamp seat moves down, and the drainage wire pressing block moves up). As a result, the drainage wire pressing block releases the drainage wire, thus causing the drainage wire to be unstable and even fall off from the C-shaped wire clamp. In order to solve this problem, the anti-rotating locking structure is provided in this solution. Specifically, after the drainage wire pressing block presses the drainage wire pre-assembled on the C-shaped wire clamp to reliably fix the drainage wire on the C-shaped wire clamp, the operator drives the supporting screw rod to rotate through the insulating drive rod, thus driving the supporting screw rod and the floating limiting disk to jack up until the floating limiting disk resists against the wire clamp seat. Hereafter, the insulating operating rod delivers the C-shaped wire clamp and the drainage wire to the position near the main overhead line. In this process, since the floating limiting disk resists against the wire clamp seat, the drainage wire will not be able to drive the C-shaped wire clamp, the wire clamp clamping device and the drainage wire pressing device to rotate around the threaded rod as a whole, thus avoiding the following problem: in the process that the insulating operating rod delivers the C-shaped wire clamp and the drainage wire to the position near the main overhead line, the longer drainage wire drives the C-shaped wire clamp, the wire clamp clamping device and the drainage wire pressing device to rotate around the threaded rod as a whole, so that the wire clamp seat and the drainage wire pressing block get far away from each other, and as a result, the drainage wire is unstable and even falls off from the C-shaped wire clamp.

As a preference, a second spring sleeves the threaded rod, and the second spring is located between the upper end of the insulating operating rod and the wire clamp seat. In this way, the second spring is abutted between the upper end of the insulating operating rod and the wire clamp seat, a friction force during the rotation of the wire clamp seat can be increased. In the process where the insulating operating rod delivers the C-shaped wire clamp and the drainage wire to the position near the main overhead line, the possibility that the drainage wire drives the C-shaped wire clamp, the wire clamp clamping device and the drainage wire pressing device to rotate around the threaded rod as a whole can be reduced, and the working stability is improved.

As a preference, a clamping block guide hole parallel to an axis of the threaded rod is formed in the wire clamp seat; a clamping block guide rod is arranged on the floating clamping block; and the clamping block guide rod is slidably inserted in the clamping block guide hole. In this way, the moving stability of the floating clamping block can be improved, so that the wire clamp clamping device stably clamps the C-shaped wire clamp.

As a preference, a lower end of the clamping block guide rod is provided with a limiting stopper; the first spring sleeves the clamping block guide rod; and the first spring is located between the wire clamp seat and the limiting stopper.

As a preference, two drainage wire pressing rods formed by extending outwardly are arranged on one side of the drainage wire pressing block; and the floating clamping block is located between the two drainage wire pressing rods. The two drainage wire pressing rods are distributed on the two sides of the floating clamping block. In this way, the structural compactness can be improved, and the drainage wire is pressed and fixed by the two drainage wire pressing rods, which is conductive to reliably fixing the drainage wire on the C-shaped wire clamp.

As a preference, drainage wire pressing slots with downward openings are arranged on the drainage wire pressing rods. In this way, the drainage wire is pressed by the drainage wire pressing slots, which is conductive to reliably fixing the drainage wire on the C-shaped wire clamp.

As a preference, a lower wire clamp clamping slot with an upward opening is arranged on the wire clamp seat; and an upper wire clamp clamping slot with a downward opening is arranged on the floating clamping block. In this way, it is conductive to stably clamping the C-shaped wire clamp by the wire clamp clamping device.

The present invention has the beneficial effects below: The manual type C-shaped wire clamp operating device has the characteristics of simple structure, convenient operation and good working stability, and can effectively solve the problem in the prior art where a drainage wire pre-assembled on the C-shaped wire clamp is unstable, and even falls off, in the working process.

Figure 1:
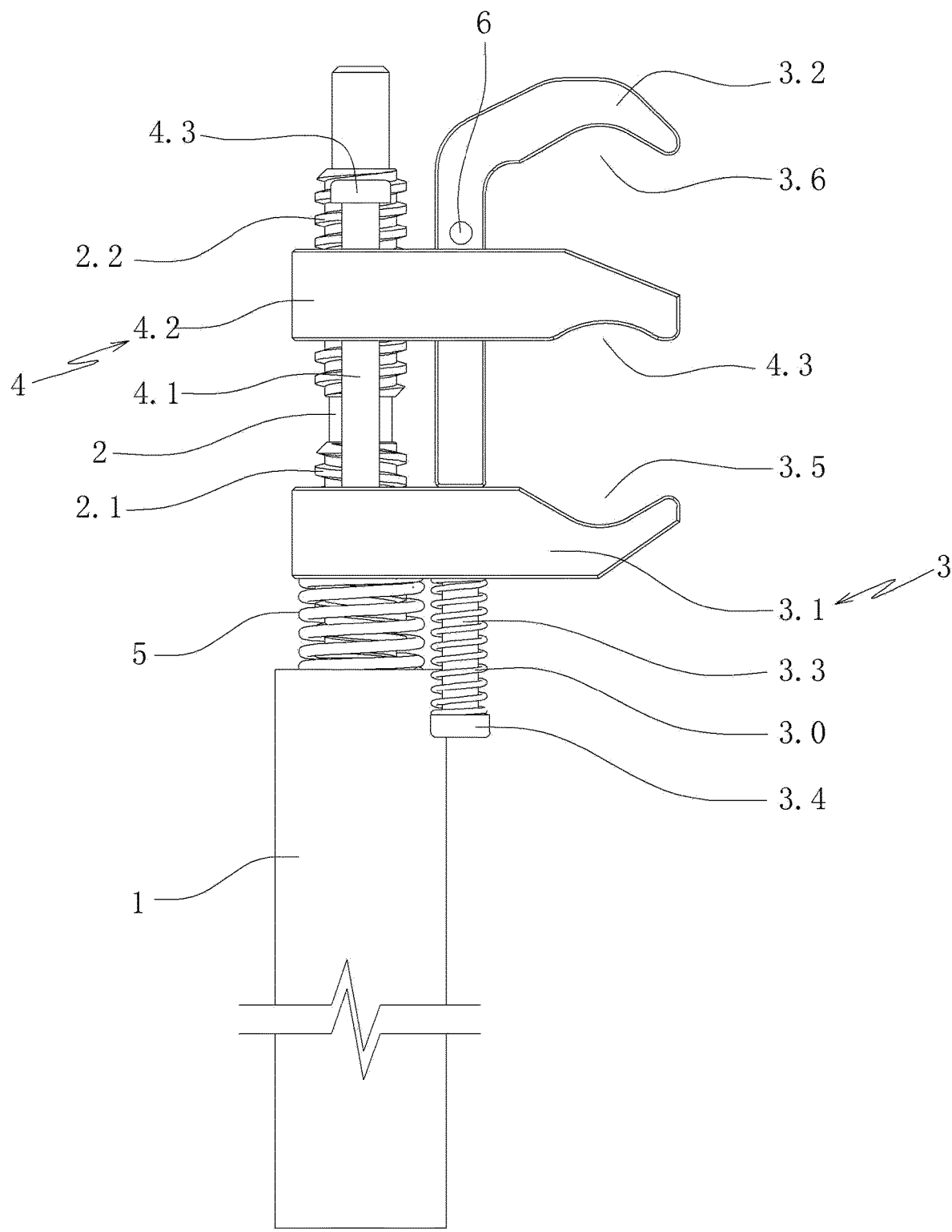
FIG. 1 is a schematic structural diagram of a manual type C-shaped wire clamp operating device according to specific embodiment I of the present invention.

In the drawings: insulating operating rod 1; threaded rod 2, lower thread 2.1, and upper thread 2.2; wire clamp clamping device 3, first spring 3.0, wire clamp seat 3.1, floating clamping block 3.2, clamping block guide rod 3.3, limiting stopper 3.4, lower wire clamp clamping slot 3.5, and upper wire clamp clamping slot 3.6; drainage wire pressing device 4, guide rod 4.1, drainage wire pressing block 4.2, drainage wire pressing rod 4.21, and drainage wire pressing slot 4.3; second spring 5; release stop rod 6; C-shaped wire clamp 7, drainage wire 7.1, and main overhead line 7.2; and anti-rotating locking structure 8, supporting disk 8.1, guide sleeve 8.2, operating rod limiting block 8.3, floating limiting disk 8.4, limiting disk passing port 8.5, limiting disk guide rod 8.6, supporting screw rod 8.7, and insulating drive rod 8.8.

DESCRIPTION OF THE EMBODIMENTS

Figure 2:
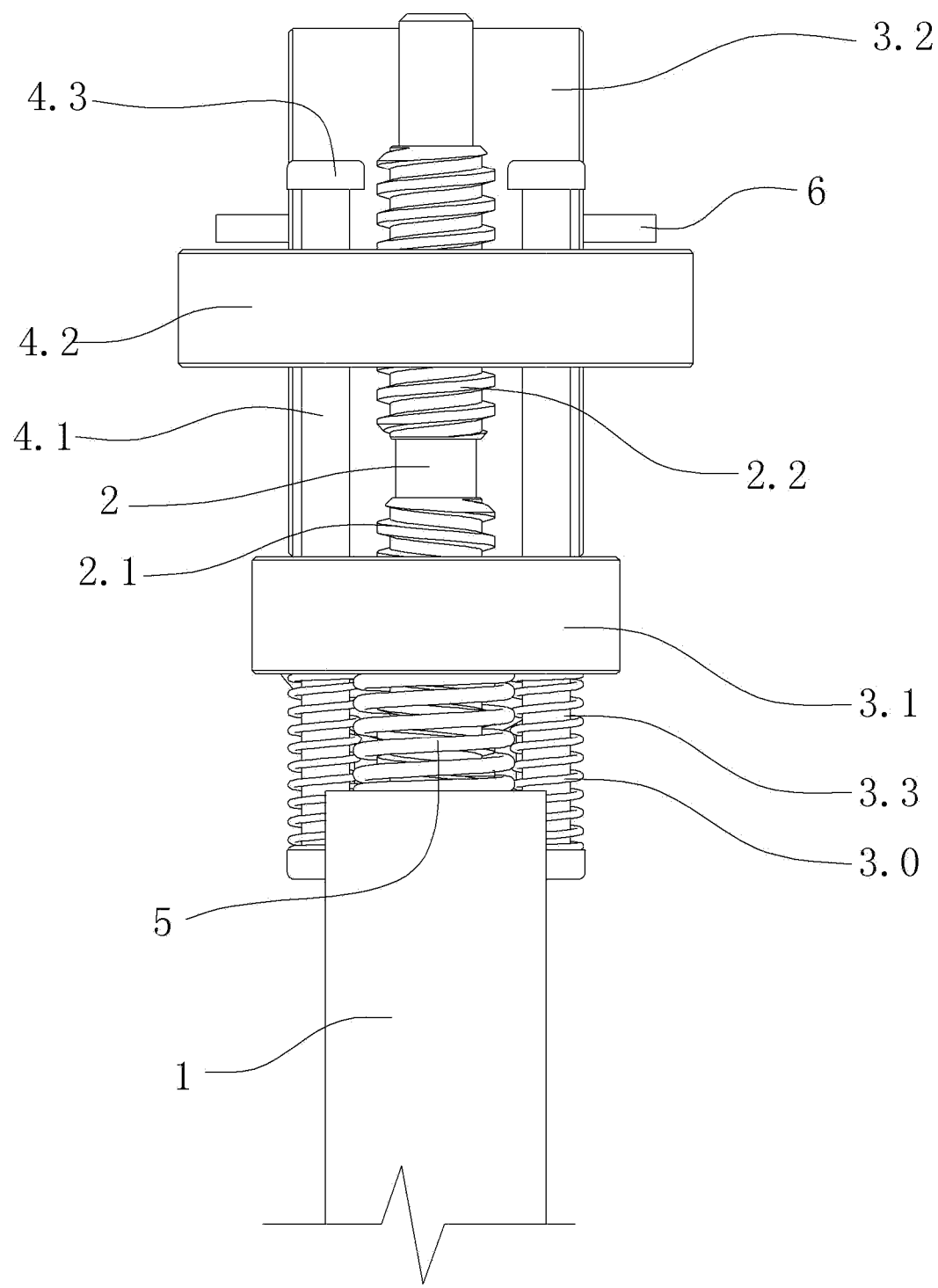
FIG. 2 is a side view of FIG. 1.
Figure 3:
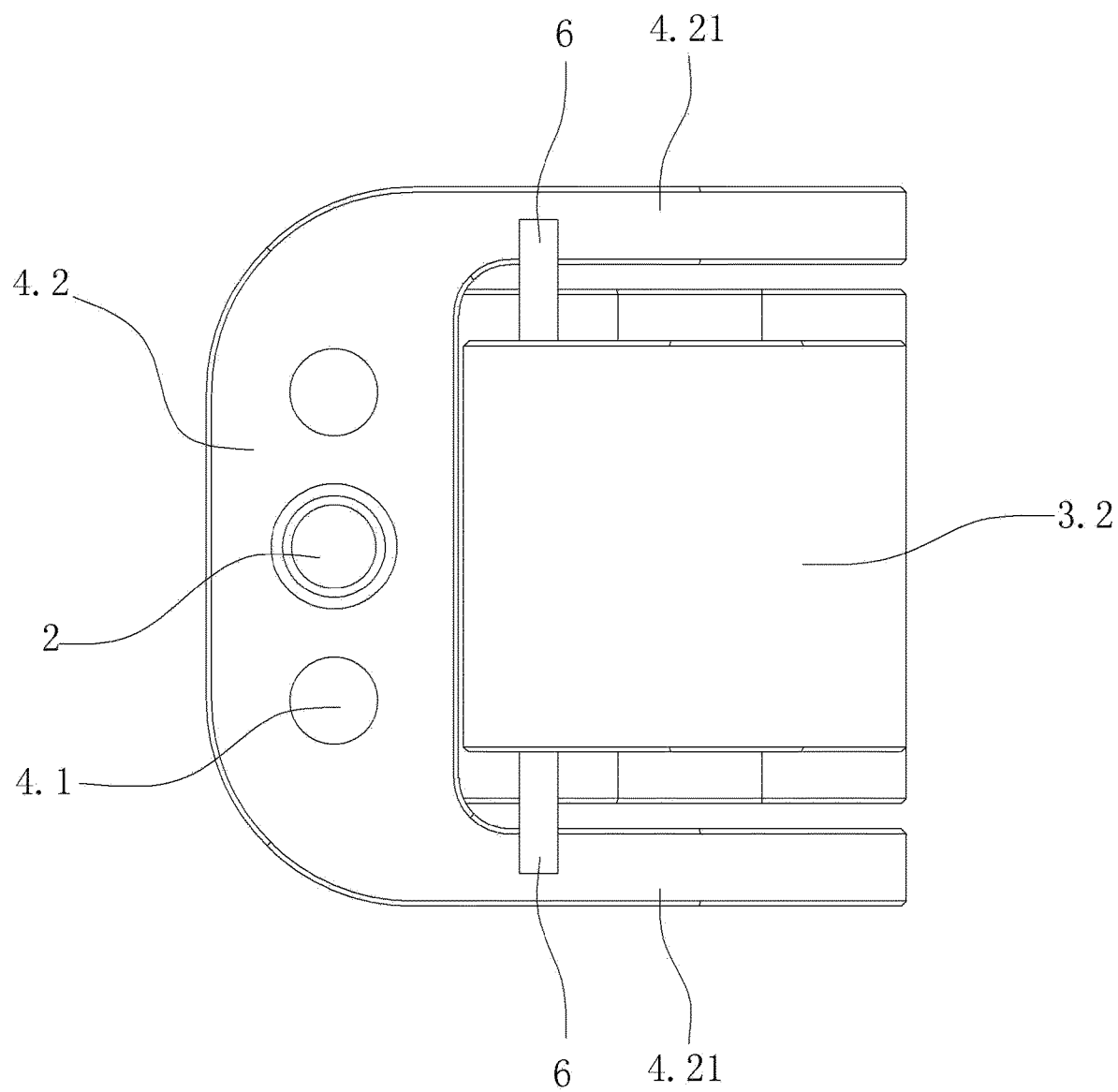
FIG. 3 is a top view of FIG. 1.

The present invention is further described in detail below in combination with accompanying drawings and specific implementations. In specific embodiment I, as shown in FIG. 1, FIG. 2, and FIG. 3, a manual type C-shaped wire clamp operating device includes an insulating operating rod 1, a wire clamp clamping device 3 and a drainage wire pressing device 4. An upper end of the insulating operating rod 1 is provided with a threaded rod 2. The threaded rod 2 includes an upper thread 2.2 and a lower thread 2.1. The upper thread 2.2 is located above the lower thread 2.1. The upper thread 2.2 and the lower thread 2.1 have opposite helical directions. In this embodiment, the insulating operating rod 1 and the threaded rod 2 are coaxially distributed.

The wire clamp clamping device 3 includes a first spring 3.0, a wire clamp seat 3.1 and a floating clamping block 3.2 located above the wire clamp seat 3.1. A wire clamp placement port for placing a C-shaped wire clamp 7 is formed between the wire clamp seat 3.1 and the floating clamping block 3.2. The first spring 3.0 is used for driving the floating clamping block 3.2 to move down, so as to clamp the C-shaped wire clamp 7 in the wire clamp placement port. A wire clamp seat threaded hole is formed in the wire clamp seat 3.1. The wire clamp seat threaded hole runs through upper and lower surfaces of the wire clamp seat 3.1. The threaded rod 2 is inserted in the wire clamp seat threaded hole, and the wire clamp seat threaded hole is in fit connection with the lower thread 2.1 of the threaded rod 2.

The drainage wire pressing device 4 is used for pressing a drainage wire 7.1. The drainage wire pressing device 4 includes a guide rod 4.1 arranged on the wire clamp seat 3.1 and a drainage wire pressing block 4.2 sliding along the guide rod 4.1. The guide rod 4.1 is parallel to the threaded rod 2. The drainage wire pressing block 4.2 is located above the wire clamp seat 3.1. A pressing block threaded hole is formed in the drainage wire pressing block 4.2, and the pressing block threaded hole runs through upper and lower surfaces of the drainage wire pressing block 4.2. The threaded rod 2 is inserted in the pressing block threaded hole, and the pressing block threaded hole is in fit connection with the upper thread 2.2 of the threaded rod 2.

Figure 4:
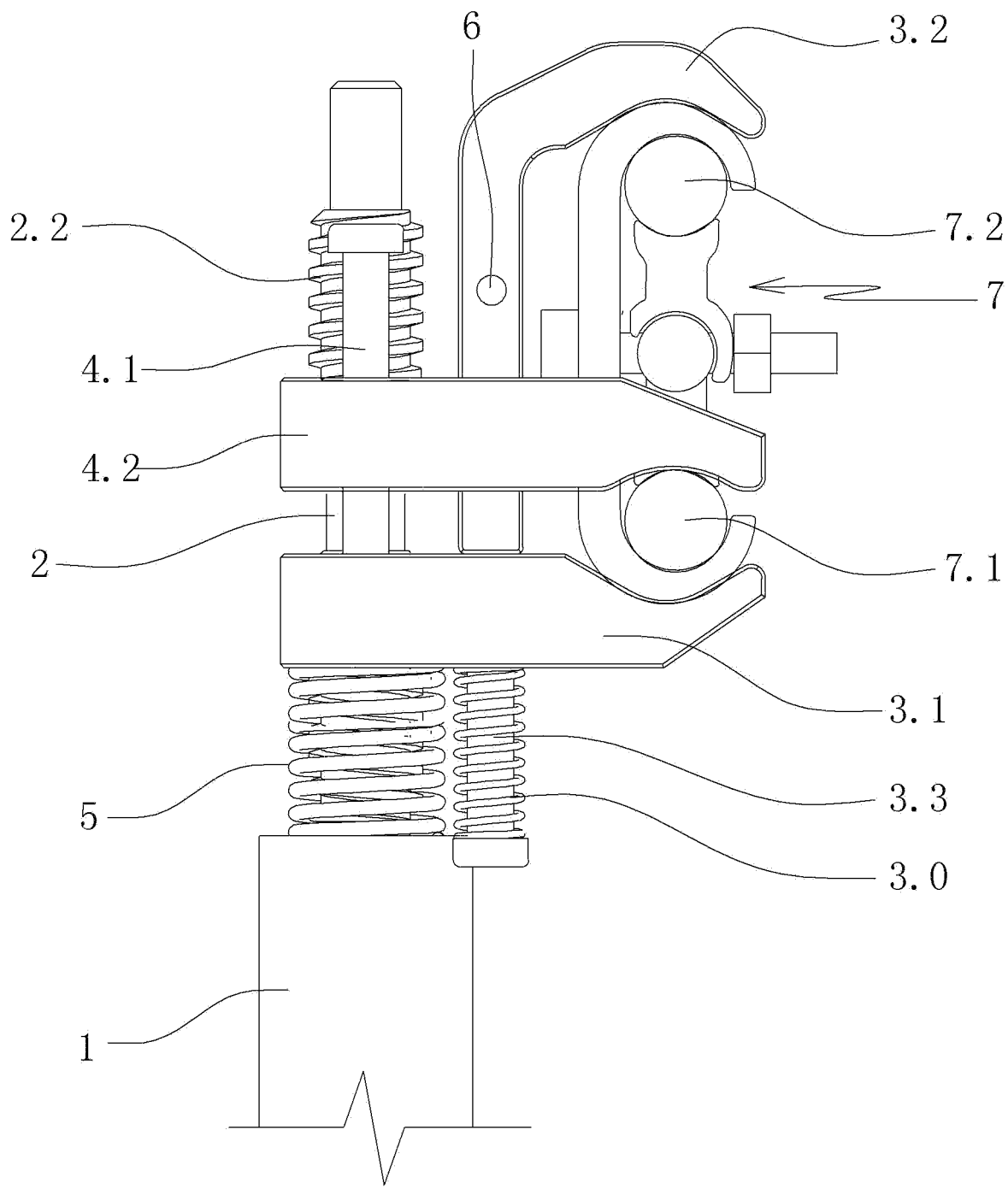
FIG. 4 is a schematic structural diagram of a manual type C-shaped wire clamp operating device according to specific embodiment I of the present invention in an actual use process.

Specific use of the manual type C-shaped wire clamp operating device of this embodiment is as follows, as shown in FIG. 4. First, the C-shaped wire clamp 7 is placed in the wire clamp placement port; the first spring 3.0 drives the floating clamping block 3.2 to move down, so as to clamp the C-shaped wire clamp 7 in the wire clamp placement port; and the drainage wire 7.1 is pre-assembled on the C-shaped wire clamp 7.

Second, the insulating operating rod 1 drives the threaded rod 2 to rotate (the wire clamp seat 3.1 is kept not rotating in this process); by rotating the threaded rod 2, the wire clamp seat 3.1 and the drainage wire pressing block 4.2 get close to each other (the wire clamp seat 3.1 moves up, and the drainage wire pressing block 4.2 moves down); and the drainage wire pressing block 4.2 presses the drainage wire 7.1 pre-assembled on the C-shaped wire clamp 7, so that the drainage wire 7.1 is reliably fixed on the C-shaped wire clamp 7 to avoid a problem where the drainage wire 7.1 pre-assembled on the C-shaped wire clamp 7 is unstable in a subsequent working process, and even falls off.

Third, the insulating operating rod 1 delivers the C-shaped wire clamp 7 and the drainage 20 wire 7.1 to a position near a main overhead line 7.2, and the main overhead line 7.2 is hung into the C-shaped wire clamp 7; and then, an operator screws up a nut of the C-shaped wire clamp 7 through a nut screw-up tool (the nut screw-up tool is prior art), thus fixing the C-shaped wire clamp 7 on the main overhead line 7.2. Fourth, the insulating operating rod 1 drives the threaded rod 2 to rotate, so that the wire clamp seat 3.1 and the drainage wire pressing block 4.2 get away from each other (the wire clamp seat 3.1 moves down, and the drainage wire pressing block 4.2 moves up), and the drainage wire pressing block 4.2 releases the drainage wire 7.1; afterwards the wire clamp clamping device 3 can be separated from the C-shaped wire clamp 7.

Specifically, as shown in FIG. 1 and FIG. 2, the wire clamp seat 3.1 is provided with a clamping block guide hole parallel to an axis of the threaded rod 2, and the clamping block guide hole runs through upper and lower surfaces of the wire clamp seat 3.1. The floating clamping block 3.2 is provided with a clamping block guide rod 3.3, and the clamping block guide rod 3.3 is inserted in the clamping block guide hole. A lower end of the clamping block guide rod 3.3 is provided with a limiting stopper 3.4. The first spring 3.0 sleeves the clamping block guide rod 3.3. The first spring 3.0 is located between the wire clamp seat 3.1 and the limiting stopper 3.4. In this way, the moving stability of the floating clamping block 3.2 can be improved, so that the wire clamp clamping device 3 stably clamps the C-shaped wire clamp 7. Interference between the C-shaped wire clamp 7 and the first spring 3.0 can also be avoided.

There are two clamping block guide rods 3.3. The clamping block guide holes are in one-to-one correspondence to the clamping block guide rods 3.3. The threaded rod 2 is located between the two clamping block guide rods 3.3. Upper ends of the clamping block guide rods 3.3 are provided with guide rod limiting blocks.

Further, as shown in FIG. 1, FIG. 2, and FIG. 3, two drainage wire pressing rods 4.21 formed by extending outwardly are arranged on one side of the drainage wire pressing block 4.2. The floating clamping block 3.2 is located between the two drainage wire pressing rods 4.21. The two drainage wire pressing rods 4.21 are distributed on the two sides of the floating clamping block 3.2. In this way, the structural compactness can be improved, and the drainage wire 7.1 is pressed and fixed by the two drainage wire pressing rods 4.21, which is conductive to reliably fixing the drainage wire 7.1 on the C-shaped wire clamp 7.

Further, as shown in FIG. 1, a drainage wire pressing slot 4.3 with a downward opening is arranged on the drainage wire pressing rod. In this way, the drainage wire 7.1 is pressed by the drainage wire pressing slots 4.3, which is conductive to reliably fixing the drainage wire on the C-shaped wire clamp 7.

A lower wire clamp clamping slot 3.5 with an upward opening is arranged on the wire clamp seat 3.1; and an upper wire clamp clamping slot 3.6 with a downward opening is arranged on the floating clamping block 3.2. In this way, it is conductive to stably clamping the C-shaped wire clamp 7 by the wire clamp clamping device 3.

Further, as shown in FIG. 1 and FIG. 2, a second spring 5 sleeves the threaded rod 2, and the second spring 5 is located between the upper end of the insulating operating rod 1 and the wire clamp seat 3.1. In the process where the insulating operating rod 1 delivers the C-shaped wire clamp 7 and the drainage wire 7.1 to the position near the main overhead line 7.2, the longer drainage wire 7.1 may possibly drive the C-shaped wire clamp 7, the wire clamp clamping device 3 and the drainage wire pressing device 4 to rotate around the threaded rod 2 as a whole, so that the wire clamp seat 3.1 and the drainage wire pressing block 4.2 get far away from each other (the wire clamp seat 3.1 moves down, and the drainage wire pressing block 4.2 moves up). As a result, the drainage wire pressing block 4.2 releases the drainage wire 7.1, thus causing the drainage wire 7.1 to be unstable. In this embodiment, the second spring 5 is abutted between the upper end of the insulating operating rod 1 and the wire clamp seat 3.1, a resistive friction force during the rotation of the wire clamp seat 3.1 is increased. In this way, in the process where the insulating operating rod 1 delivers the C-shaped wire clamp 7 and the drainage wire 7.1 to the position near the main overhead line 7.2, the rotation of the wire clamp seat 3.1 is subjected to higher resistance, the possibility that the drainage wire 7.1 drives the C-shaped wire clamp 7, the wire clamp clamping device 3 and the drainage wire pressing device 4 to rotate around the threaded rod 2 as a whole can be reduced, and the working stability is improved.

Further, as shown in FIG. 1, FIG. 2 and FIG. 3, the manual type C-shaped wire clamp operating device further includes a release structure. The release structure includes a release stop rod 6 arranged on the floating clamping block 3.2. The release stop rod 6 is located above the drainage wire pressing block 4.2. In this embodiment, there are two release stop rods 6 which are distributed on two opposite sides of the floating clamping block 3.2. The release stop rods 6 are in one-to-one correspondence to the drainage wire pressing rods 4.21. The release stop rods 6 are located above the corresponding drainage wire pressing rods 4.21. In the process where the drainage wire pressing block 4.2 slides up along the guide rod 4.1, after the drainage wire pressing block 4.2 resists against the release stop rod 6, the drainage wire pressing block 4.2 drives the floating clamping block 3.2 to move up through the release stop rod 6. In this way, after the C-shaped wire clamp 7 is fixed on the main overhead line 7.2, the operator drives the threaded rod 2 to rotate through the insulating operating rod 1, so that in the process where the wire clamp seat 3.1 and the drainage wire pressing block 4.2 get far away from each other (the wire clamp seat 3.1 moves down, and the drainage wire pressing block 4.2 moves up), the drainage wire pressing block 4.2 first releases the drainage wire 7.1. Then, the drainage wire pressing block 4.2 resists against the release stop rod 6, and the release stop rod 6 drives the floating clamping block 3.2 to move up (to overcome an acting force of the first spring 3.0), thus enabling the floating clamping block 3.2 to release the C-shaped wire clamp 7. Hereafter, the wire clamp clamping device 3 can be conveniently separated from the C-shaped wire clamp to complete the mounting of the C-shaped wire clamp 7.

Figure 5:
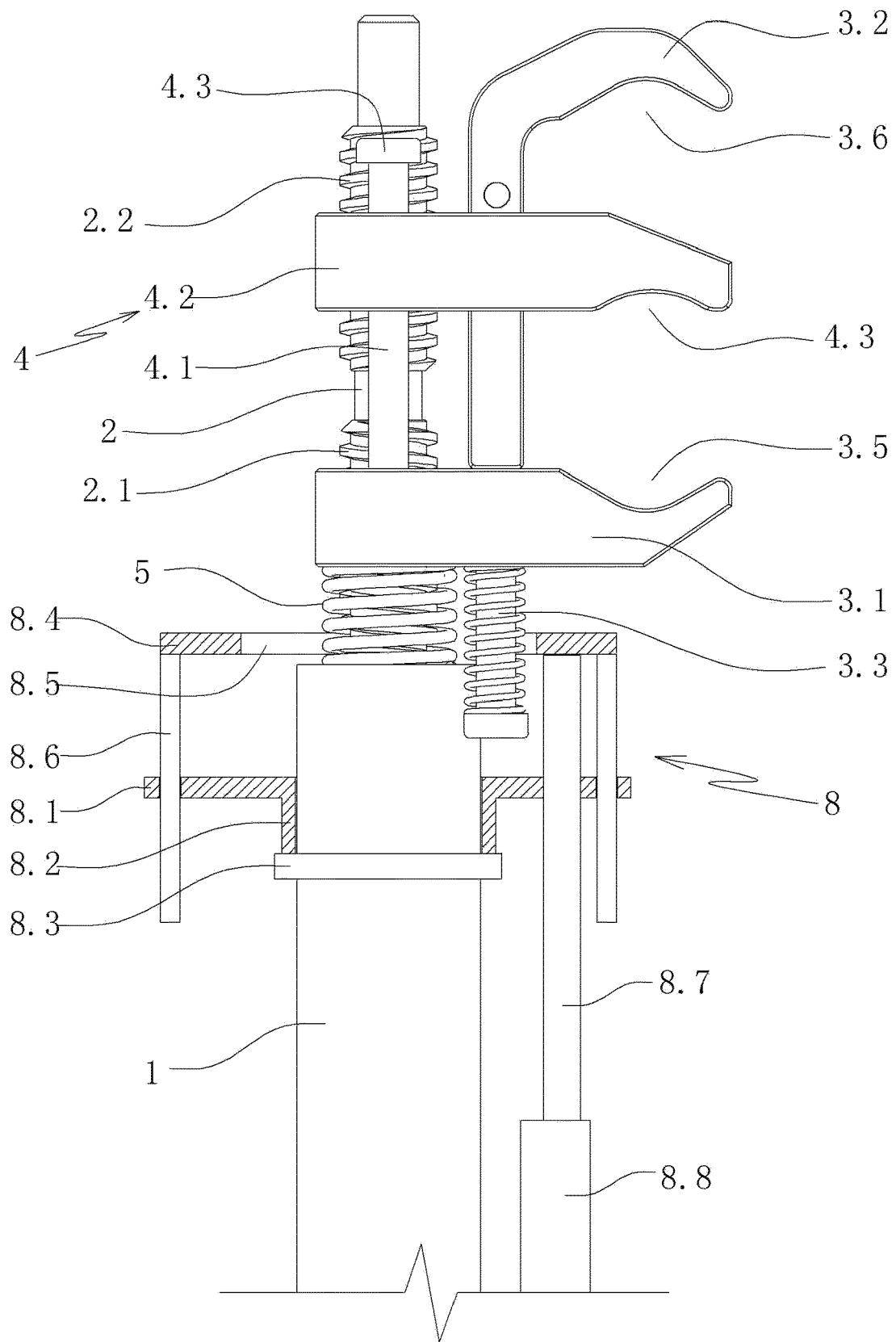
FIG. 5 is a schematic structural diagram of a manual type C-shaped wire clamp operating device according to specific embodiment II of the present invention.

In specific embodiment II, other structures in this embodiment refer to those in specific embodiment I, and a difference is as follows. As shown in FIG. 5, the manual type C-shaped wire clamp operating device further includes an anti-rotating locking structure 8. The anti-rotating locking structure 8 includes a supporting disk 8.1, a floating limiting disk 8.4, a supporting screw rod 8.7 and an insulating drive rod 8.8. The supporting disk 8.1 is provided with a guide sleeve 8.2. The guide sleeve 8.2 slidably sleeves the insulating operating rod 1. An upper portion of the insulating operating rod 1 is provided with an operating rod limiting block 8.3. The guide sleeve 8.2 is located above the operating rod limiting block 8.3. The guide sleeve 8.2 supports the operating rod limiting block 8.3. The supporting disk 8.1 is provided with a supporting disk guide hole and a supporting disk screw hole. A limiting disk passing port 8.5 is formed in the middle of the floating limiting disk 8.4. The threaded rod 2 passes through the limiting disk passing port 8.5. In this embodiment, the clamping block guide rod 3.3 also passes through the limiting disk passing port 8.5. The floating limiting disk 8.4 is located between the supporting disk 8.1 and the wire clamp seat 3.1. The lower surface of the wire clamp seat 3.1 is a plane, and is parallel to the upper surface of the floating limiting disk 8.4. A limiting disk guide rod 8.6 is arranged on the floating limiting disk 8.4, and is slidably inserted in the supporting disk guide hole. The supporting screw rod 8.7 is parallel to the insulating operating rod 1. The supporting screw rod 8.7 is inserted in the supporting disk screw hole, and is matched with the supporting disk screw hole. The supporting screw rod 8.7 is located below the floating limiting disk 8.4 to support the floating limiting disk 8.4. An upper end of the insulating drive rod 8.8 is connected with a lower end of the supporting screw rod 8.7.

In the working process, although the drainage wire pressing device 4 reliably fixes the drainage wire 7.1 on the C-shaped wire clamp 7, in the process where the insulating operating rod 1 delivers the C-shaped wire clamp 7 and the drainage wire 7.1 to the position near the main overhead line 7.2, the longer drainage wire 7.1 may possibly drive the C-shaped wire clamp 7, the wire clamp clamping device 3 and the drainage wire pressing device 4 to rotate around the threaded rod 2 as a whole, so that the wire clamp seat 3.1 and the drainage wire pressing block 4.2 get far away from each other (the wire clamp seat 3.1 moves down, and the drainage wire pressing block 4.2 moves up). As a result, the drainage wire pressing block 4.2 releases the drainage wire 7.1, thus causing the drainage wire 7.1 to be unstable and even fall off from the C-shaped wire clamp 7. To solve this problem, the anti-rotating locking structure 8 is provided in this embodiment, specifically as follows: An operator drives the threaded rod 2 to rotate through the insulating operating rod 1 to enable the wire clamp seat 3.1 to get close to the drainage wire pressing block 4.2, and presses the drainage wire 7.1 pre-assembled on the C-shaped wire clamp 7 through the drainage wire pressing block 4.2 to reliably fix the drainage wire 7.1 on the C-shaped wire clamp 7. Then, the operator drives the supporting screw rod 8.7 to rotate through the insulating drive rod 8.8, thus driving the supporting screw rod 8.7 and the floating limiting disk 8.4 to jack up until the floating limiting disk 8.4 resists against the wire clamp seat 3.1. Hereafter, the insulating operating rod 1 delivers the C-shaped wire clamp 7 and the drainage wire 7.1 to the position near the main overhead line 7.2. In this process, since the floating limiting disk 8.4 resists against the wire clamp seat 3.1, the drainage wire 7.1 will not be able to drive the C-shaped wire clamp 7, the wire clamp clamping device 3 and the drainage wire pressing device 4 to rotate around the threaded rod 2 as a whole, thus avoiding the following problem: in the process where the insulating operating rod 1 delivers the C-shaped wire clamp 7 and the drainage wire 7.1 to the position near the main overhead line 7.2, the longer drainage wire 7.1 drives the C-shaped wire clamp 7, the wire clamp clamping device 3 and the drainage wire pressing device 4 to rotate around the threaded rod 2 as a whole, so that the wire clamp seat 3.1 and the drainage wire pressing block 4.2 get far away from each other, and as a result, the drainage wire 7.1 is unstable and even falls off from the C-shaped wire clamp 7.

After the C-shaped wire clamp 7 is fixed on the main overhead line 7.2, the operator first drives the supporting screw rod 8.7 to rotate through the insulating drive rod 8.8, thus driving the supporting screw rod 8.7 and the floating limiting disk 8.4 to move down to separate the floating limiting disk 8.4 and the wire clamp seat 3.1. Then, the operator drives the threaded rod 2 to rotate through the insulating operating rod 1, thus enabling the wire clamp seat 3.1 and the drainage wire pressing block 4.2 to get far away from each other (the wire clamp seat 3.1 moves down, and the drainage wire pressing block 4.2 moves up). The drainage wire pressing block 4.2 releases the drainage wire 7.1. The anti-rotating locking structure 8 of this embodiment will not affect the normal work of the manual type C-shaped wire clamp operating device.

The above descriptions are only preferred embodiments of the present invention, and do not make any limitation to the present invention. Any simple modifications, changes and equivalent transformations made to the above embodiments according to the technical essence of the present invention still all fall within the protection scope of the technical solution of the present invention.

What is claimed is:

1. A manual type C-shaped wire clamp operating device, comprising:
    an insulating operating rod, wherein an upper end of the insulating operating rod is provided with a threaded rod, the threaded rod comprises an upper thread and a lower thread, and the upper thread and the lower thread have opposite helical directions;
    a wire clamp clamping device, wherein the wire clamp clamping device comprises a first spring, a wire clamp seat and a floating clamping block located above the wire clamp seat, a wire clamp placement port for placing a C-shaped wire clamp is formed between the wire clamp seat and the floating clamping block, the first spring is used for driving the floating clamping block to move down, so as to clamp the C-shaped wire clamp in the wire clamp placement port, a wire clamp seat threaded hole is formed in the wire clamp seat, and the wire clamp seat threaded hole is in fit connection with the lower thread of the threaded rod; and
    a drainage wire pressing device, used for pressing a drainage wire, wherein the drainage wire pressing device comprises a guide rod arranged on the wire clamp seat and a drainage wire pressing block sliding along the guide rod, the guide rod is parallel to the threaded rod, a pressing block threaded hole is formed in the drainage wire pressing block, the drainage wire pressing block is located above the wire clamp seat, and the pressing block threaded hole is in fit connection with the upper thread of the threaded rod.

2. The manual type C-shaped wire clamp operating device according to claim 1, further comprising a release structure, wherein the release structure comprises a release stop rod arranged on the floating clamping block, and the release stop rod is located above the drainage wire pressing block.

3. The manual type C-shaped wire clamp operating device according to claim 2, wherein in a process that the drainage wire pressing block slides up along the guide rod, after the drainage wire pressing block resists against the release stop rod, the drainage wire pressing block drives the floating clamping block to move up through the release stop rod.

4. The manual type C-shaped wire clamp operating device according to claim 1, further comprising an anti-rotating locking structure, wherein the anti-rotating locking structure comprises:
    a supporting disk, wherein the supporting disk is provided with a guide sleeve, the guide sleeve slidably sleeves the insulating operating rod, an upper portion of the insulating operating rod is provided with an operating rod limiting block, the guide sleeve is located above the operating rod limiting block, and the supporting disk is provided with a supporting disk guide hole and a supporting disk screw hole;
    a floating limiting disk, wherein a limiting disk passing port is arranged in a middle of the floating limiting disk, the threaded rod passes through the limiting disk passing port, the floating limiting disk is located between the supporting disk and the wire clamp seat, the floating limiting disk is provided with a limiting disk guide rod, and the limiting disk guide rod is slidably inserted in the supporting disk guide hole;
    a supporting screw rod, wherein the supporting screw rod is parallel to the insulating operating rod, the supporting screw rod is matched with the supporting disk screw hole, and the supporting screw rod is located below the floating limiting disk to support the floating limiting disk; and
    an insulating drive rod, wherein an upper end of the insulating drive rod is connected with a lower end of the supporting screw rod.

5. The manual type C-shaped wire clamp operating device according to claim 1, wherein a second spring sleeves the threaded rod; and the second spring is located between the upper end of the insulating operating rod and the wire clamp seat.

6. The manual type C-shaped wire clamp operating device according to claim 1, wherein a clamping block guide hole parallel to an axis of the threaded rod is formed in the wire clamp seat, a clamping block guide rod is arranged on the floating clamping block, and the clamping block guide rod is slidably inserted in the clamping block guide hole.

7. The manual type C-shaped wire clamp operating device according to claim 6, wherein a lower end of the clamping block guide rod is provided with a limiting stopper, the first spring sleeves the clamping block guide rod, and the first spring is located between the wire clamp seat and the limiting stopper.

8. The manual type C-shaped wire clamp operating device according to claim 1, wherein two drainage wire pressing rods formed by extending outwardly are arranged on one side of the drainage wire pressing block, and the floating clamping block is located between the two drainage wire pressing rods.

9. The manual type C-shaped wire clamp operating device according to claim 8, wherein drainage wire pressing slots with downward openings are arranged on the drainage wire pressing rods.

10. The manual type C-shaped wire clamp operating device according to claim 1, wherein a lower wire clamp clamping slot with an upward opening is arranged on the wire clamp seat, and an upper wire clamp clamping slot with a downward opening is arranged on the floating clamping block.

* * * * *